United States Patent [19]

Membrino et al.

[11] 3,800,440
[45] Apr. 2, 1974

[54] RADIO IDENTIFICATION SYSTEM SIMULATOR (IFF)

[75] Inventors: Robert J. Membrino, Silver Spring; Edward F. Magee, Crofton, both of Md.

[73] Assignee: The Singer Company, Binghamton, N.Y.

[22] Filed: Sept. 1, 1972

[21] Appl. No.: 285,668

[52] U.S. Cl.................................. 35/10.4, 343/17.7
[51] Int. Cl.......................... G06g 7/78, G09b 9/00
[58] Field of Search...................... 35/10.4; 343/17.7

[56] References Cited
UNITED STATES PATENTS

| | | | |
|---|---|---|---|
| 3,357,016 | 12/1967 | Peronneau et al.................... | 35/10.4 |
| 3,374,481 | 3/1968 | Lupinetti............................. | 35/10.4 |
| 3,718,988 | 3/1973 | Ball et al............................. | 35/10.4 |

*Primary Examiner*—Maynard R. Wilbur
*Assistant Examiner*—G. E. Montone
*Attorney, Agent, or Firm*—William Grobman

[57] ABSTRACT

Radar equipment very often includes a separate code querying signal which is used to identify a target vehicle as friend or foe. When the code radio signal impinges upon a friendly target vehicle, it triggers a "transponder" which generates and transmits a corresponding code signal. The signal generated by the target vehicle is received by the radar antenna and is displayed on the radar screen adjacent the return image of the target itself. The simulator of this disclosure is an adjunct to digital radar simulators. Information representing the condition of the simulated target vehicle is stored in a memory, and that information is decoded to drive two shift registers to generate any of three possible IFF display signals. The decoded pulse is applied to the inputs of a pair of shift registers which are stepped by the output of a clock. The outputs from the shift registers are circulated, when appropriate, to generate multiple display signals. The result is one, two, or four bars displayed on the radar screen.

6 Claims, 3 Drawing Figures

RADIO IDENTIFICATION SYSTEM SIMULATOR (IFF)

CROSS-REFERNCES TO RELATED APPLICATIONS

The subject matter of this application is a device which can be used in the system disclosed in the Patent Application Ser. No. 243,804; filed Apr. 13, 1972; in the names of Robert J. Membrino and Edward F. Magee; and entitled "Collision Avoidance Radar Interface."

BACKGROUND OF THE INVENTION

1. Field of the Invention

Basically, a radar system comprises a transmitter which generates a pulse of high frequency radio energy; an antenna which is highly directional and which broadcasts the high frequency energy generated by the generator; a highly directional receiving antenna, which may be the same as the transmitting antenna; and a receiver for receiving and displaying any received reflections of the transmitted pulse. In some radar systems which are called plan position indicator radar display systems, the common antenna rotates at a fixed rate, and the energy pulses transmitted gradually cover a cylindrical volume adjacent the antenna. Any reflective target in that cylinder reflects a portion of the energy back to the antenna where it is received and decoded by the receiver. Most radar displays comprise a cathode ray tube. In the plan position indicator (PPI), the beam rest position is in the center of the CRT face, and the beam is swept out radially toward the outer edge of the screen. Each successive radial trace is slightly displaced circumferentially from the previous trace so that the beam eventually covers the entire face of the tube in the same time that the antenna makes one complete revolution. The position of the beam and the direction of rotation of the antenna are synchronized. In addition, the radial movement of the beam closely synchronizes with the propagation through space of the transmitted pulse and its reflection.

In addition to the basic system, modern radar equipment includes means for encoding energy transmitted by the antenna. When this encoded energy is impinged upon a target which is properly equipped, the received energy is decoded by equipment on the target and initiates the transmission of a beam of energy from the target. The energy is also encoded, and its receipt by the radar antenna produces identifying marks on the face of the cathode ray tube. This invention comprises a means for simulating that radar identification system.

2. Prior Art

Early radar simulators were of the analog type in which, for example, a map or transparency was made of the area to be displayed on the radar screen, and light was transmitted through the map or transparency under the control of the vehicle movement. The only variable permitted in this type of system was the area of the map or transparency being displayed. In systems of this type, IFF was generally not used.

In a patent which discloses one system for simulating IFF signals, U.S. Pat. No. 3,205,293; issued on Sept. 7, 1965; in the name of J. J. Zyskowski; the system disclosed is not automatic, and both the targets identified by IFF response and the type of response to be displayed are determined by manual selector switches.

SUMMARY OF THE INVENTION

This invention relates to simulators and more particularly to a system for simulating standard radio recognition equipment and operation.

This invention comprises apparatus for use in conjunction with systems simulating radar apparatus and which identify the radar targets in any of several ways. The system being simulated is called an IFF (Information Friend or Foe) system and is used in modern aircraft, particularly in military aircraft, to identify mobile targets as friendly or not friendly. The simulator of this invention produces the appropriate one of three different identifying displays adjacent the particular target designated.

It is an object of this invention to provide a new and improved electronic apparatus.

It is another object of this invention to provide a new and improved electronic simulator.

It is a further object of this invention to provide a new and improved simulator for simulating the operation of a radar recognition system.

Other objects and advantages of this invention will become more apparent as the following description proceeds, which description should be considered together with the following drawings.

DESCRIPTION OF THE PREFERRED EMBODIMENT

Figure 1:
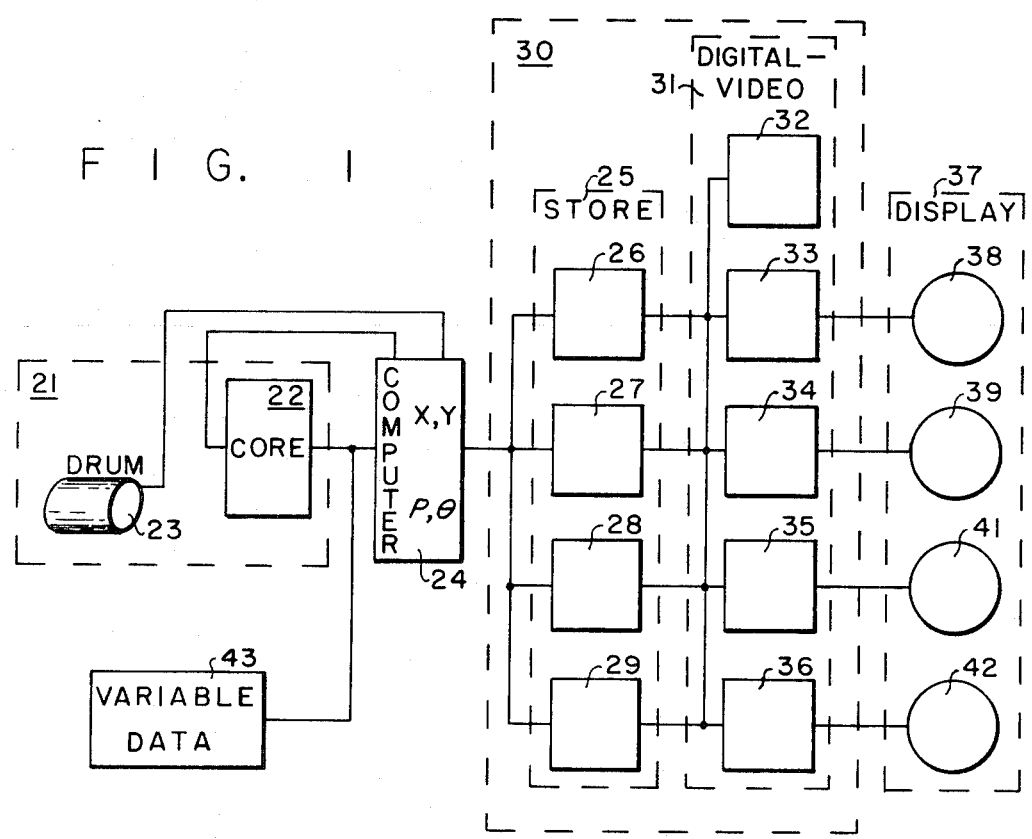
FIG. 1 is a block diagram of a typical digital radar simulator.

Referring now to the drawings in detail, and to FIG. 1 in particular; the reference character 21 designates a memory system which includes a magnetic core memory array 22 and a magnetic drum 23. Both the core array 22 and the drum 23 are connected in an information exchange relationship with a general-purpose digital computer 24. A source of variable data 43 is also connected to an input of the computer 24. The output from the computer 24 is applied to an interface 30 which includes a plurality of stores 26, 27, 28, and 29. The outputs from the individual stores 26–29 are applied to the inputs of individual digital-to-video converters 33, 34, 35, and 36 whose outputs are supplied individually to a plurality of displays 38, 39, 41, and 42.

In the operation of the system of FIG. 1, a computer program which defines the rectangular coordinates and the intensity of all of the radar targets anywhere in the world which are to be displayed upon the system are stored on the drum 23. These targets are further identified in groups known as sets. Utilizing the variable data input 43, an instructor or operator of the system inserts into the computer 24 the location of the ship whose radar display is to be simulated. With the location of that ship, the computer 24 reads from the drum 23 those sets of radar targets which are within the range of the simulated ship and causes that information to be stored in the core memory array 22. Since the system of FIG. 1 is designed to operate a plurality of displays (four displays as shown in FIG. 1), the same step of reading the appropriate information from the drum 23 and storing it in the array 22 is performed for each of the four ships designated to the computer by the source of variable data 43. The computer 24 then converts the rectangular information stored in the array 22 for a single display for one ship at a time into the polar coordinate information required for the radar display. This invention is stored in the individual store 26–29 which is associated with the particular ship in question. Thus, the apparatus to the left of block 30 is common to all of the four ships, and the results of its computations are stored in the individual stores for each of the ships. The digital-to-video converters 33–36 read information from the individual stores to which they are connected to generate video signals on an individual sweep basis. Thus, although the store 26 may contain sufficient information for a complete display of the radar targets around a particular ship, only sufficient information is supplied to the converter 33 at any time to present to the display 38 the targets on a single radial sweep. The system is so arranged that the information in each of the stores 26–29 is periodically updated.

Figure 2:
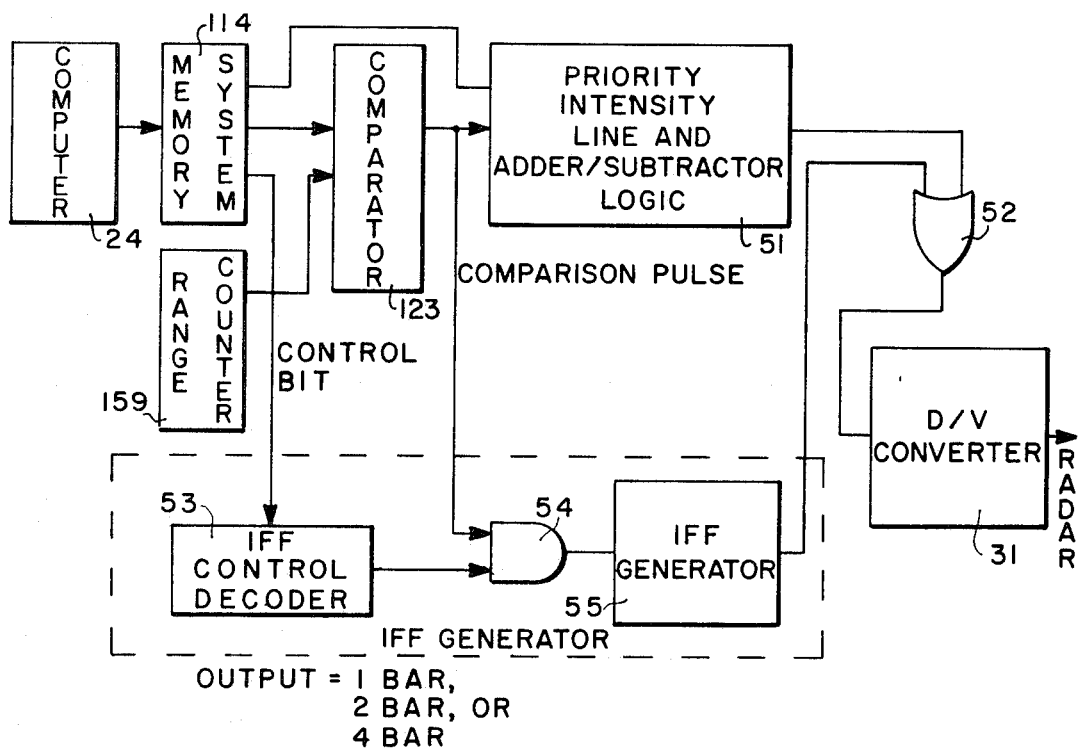
FIG. 2 is a block diagram of a portion of the radar simulator shown in FIG. 1 in conjunction with the IFF simulator.

In FIG. 2, the computer 24 has its output connected to a memory 114. The output of the memory 114 supplies one input of a comparator 123, the other input to which comes from a range counter 159. The output of the comparator 123 is applied to the input of a priority system 51 whose output is connected through an OR gate 52 to the input of the D–to–V converter 31. In addition, the output of the memory 114 is also supplied to an input of an IFF decoder 53. The output of the decoder 53 is connected to one input of an AND gate 54, the other input to which comes from the output of the comparator 123. The output of the gate 54 is applied as one input to an IFF signal source 55 whose output is also applied to an input to the OR gate 52.

FIG. 2 is a highly schematic block diagram of a portion of the system of FIG. 1 with the addition of an IFF generator. The computer 24 supplies information to a memory 114 which is in the interface 30. Considering the system shown in the copending application Ser. No. 243,804, memory 114 of FIG. 2 corresponds to memory A of FIG. 4Z of that application. In the system of the copending application, two memories 114 and 115 are used to receive the same information so that one can be loaded while the other is being used. For purposes of simplicity, only one such memory is discussed in this application although it is to be assumed that duplicate memories also may be used. The contents of memory 114 at any time represents all of the targets on one radial sweep of the display as a plurality of information words each of which identifies one target. Each word comprises 16 digits of which 11 digits represent the range of the target and five digits represent the intensity, the priority, and the IFF code. As shown in FIG. 2, the 11 digits which represent the range are applied to one input of a comparator 123 while the 11-digit output from the range counter 159 is applied to the other input of the comparator 123. When correspondence is reached between the range contained in the memory 114 and the range output of the counter 159, the comparator 123 generates an output signal which indicates that a target is to be displayed. This serves as a trigger to open appropriate circuits for transmitting to the displays 37 the decoded intensity of the radar target display and the decoded IFF code. The five digits which represent the IFF code are applied to the decoder 53 where they are decoded to supply the appropriate signals through the gate 54 to the signal source 55 to cause the generation of the proper IFF display. The five digits which represent the IFF code are applied to the decoder 53, but the output of the decoder 53 is not applied to the signal source 55 until the gate 54 receives the comparator output signal. The output from the IFF generator is applied through the OR gate 52 to the input of the digital-to-video converter 31 for application to the appropriate display tube.

Figure 3:
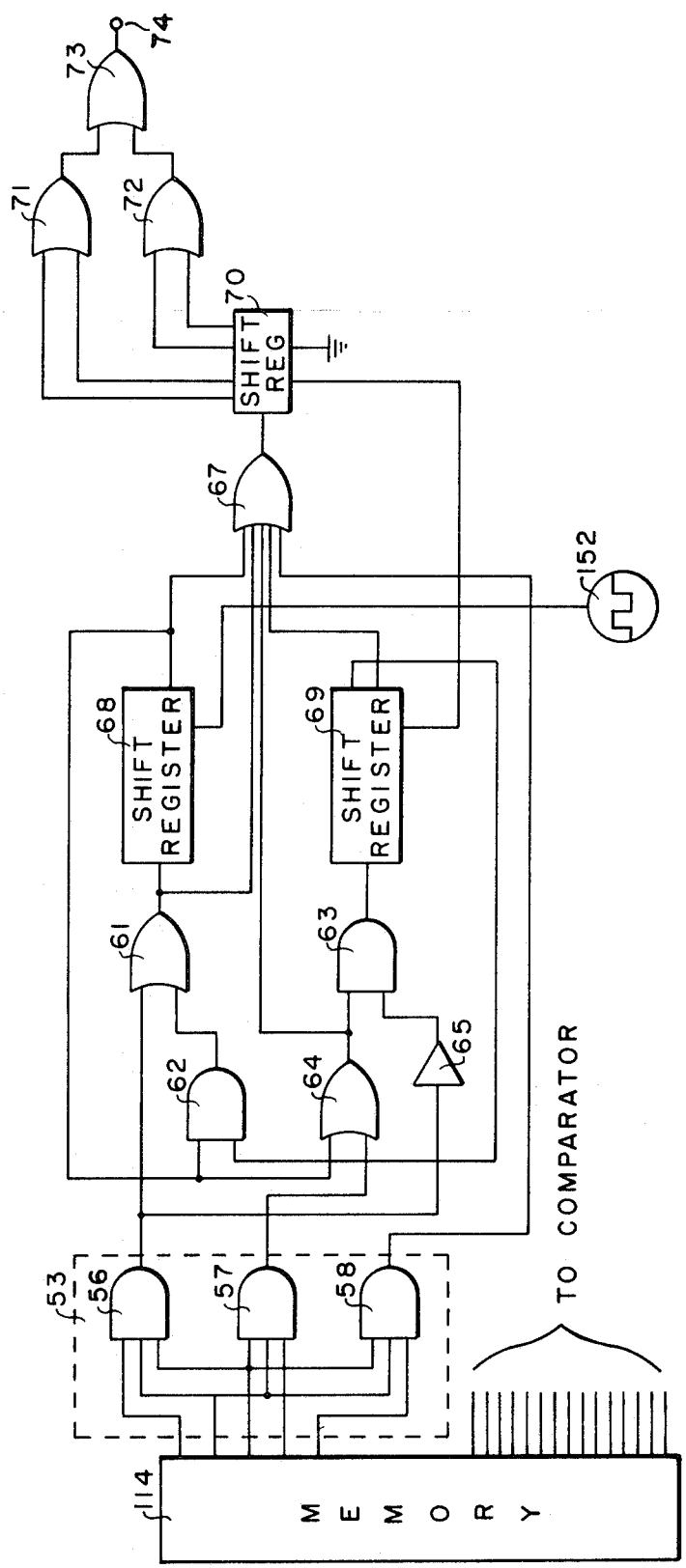
FIG. 3 is a block diagram of the IFF generator itself.

The IFF generator is shown in detail in FIG. 3 in which the memory 114 has five output lines connected to the input of the decoder 53. The decoder 53 comprises AND gates 56, 57, and 58. Two of the output lines from the memory 114 are common to all of the gates 56–58, and the other three output lines from the memory 114 are unique to one or the other of the gates 56–58. In this manner, each of the gates 56, 57, and 58 receives a unique combination of output signals from the memory 114. The output from the gate 56 is applied to one input of an OR gate 61, whose other input is received from the output of an AND gate 62, and also through an inverter 65 to one input of an AND gate 63. The other input to the gate 63 comes from the output of an OR gate 64, whose output is also applied to one input of an OR gate 67. The output of the gate 57 is applied as one input to the gate 64, and the output of the gate 58 is applied as another input to the gate 67. The output of the gate 61 is applied as an input to a shift register 68 and to a third input of the gate 67. The single output from the register 68 is applied as a fourth input to the gate 67, as the second input to gate 62, and as the second input to gate 64. The output of the gate 63 is applied as the input to a shift register 69 which is a duplicate of the register 68. Register 69 has two outputs, the true output being connected to the fifth input of the gate 67, and the false output being connected to the other input of gate 62. A clock generator, operating at four megahertz, supplies clock pulses to the registers 68 and 69. The output of the gate 67 is applied to the input of another, shorter shift register 70 which has four outputs. Two of the outputs from the register 70 are applied as inputs to an OR gate 71 and the other two outputs are applied as the inputs to an OR gate 72. The outputs from the two gates 71 and 72 are applied as the two inputs to an output OR gate 74 which feeds an output terminal 74.

In operation, the five output lines of the memory 114 determine which of the three gates 56–58 opens to pass a signal. When the gate 56 opens, the apparatus of FIG. 3 generates four bars on the display; when the gate 57 opens, the apparatus generates two bars; and when the gate 58 opens, one bar is generated. Assume that the gate 56 opens. The output from the gate 56 is applied for a very short interval (in the order of ¼–½ microsecond) to the gate 61 and through the inverter 65 to the gate 63. The gate 63 is prevented from opening because the high output from the gate 56 becomes a low input to the gate 63 with passage through the inverter 65. However, the signal passes through the gate 61 and is applied as an input to the shift register 68 and to the gate 67. Passing through the gate 67, the signal is applied to the shift register 70. The register 70 is a four-digit register, and when the signal is applied at the input, it is stepped by the clock pulses from the clock 152 through the four positions. Each digit position of the register 70 has an output which is applied through the gates 71, 72, and 73 to the output terminal 74. Since the pulse is stepped through all of the four positions, and since all of the positions have outputs, the final output at the terminal 74 is a single pulse which is four clock pulses long. The clock 152 generates pulses at the rate of four megahertz so that each clock pulse is one quarter of a microsecond in length. The output pulse at the terminal 74 is one microsecond wide. Thus, when the gate 56 generates an output signal, it passes directly through the gates 61 and 67 to the register 70 to provide the first output bar. At the same time, the output from the gate 56 was applied to the input to the register 68. This pulse is clocked through the register 68 by the pulses from the clock 152. The registers 68 and 69 are each 32 digits in length, so it requires 32 clock pulses, or eight microseconds, to shift an input pulse to the output of the register 68 and 69. At the end of the eight microseconds, a signal appears at the output of the register 68 and is applied through the gate 67 to the input of the register 70. This is the second bar which appears seven microseconds after the first expires. At the same time, the output from register 68 is applied to the inputs of the gates 62 and 64. Passing through the gate 64, the signal is applied to one input of the gate 63. Since the output from the gate 56 had long before decayed, its output is low, placing two high inputs on the gate 63. The gate 63 opens, applying an input to the register 69. The register 69 has both a true and a false output. These two outputs are always the inverse of each other, so that when Q is high, $\bar{Q}$ is low. At the time that an input is applied to the gate 62, Q is low and $\bar{Q}$ is high. This places a second high input on the gate 62 which opens and applies an input to the register 68. At this time, all of the registers 68, 69, and 70 have inputs applied to them. The outputs (four of them at clock pulse spacing) of the register 70 are applied through the gates 71–73 to the output terminal 74 to provide the second bar. In the meantime, the pulses in the registers 68 and 69 are being stepped through those registers. At the end of 32 clock pulse times, a high signal appears at the output of the register 68 and at the Q output of the register 69. The $\bar{Q}$ output of the register 69 goes low. This closes the gate 62 and applies an input to the gate 67 to start the generation of the third bar. The output from the register 68 is applied to one input of the gate 63 through the gate 64, and the other input to the gate 63 is high since the output of the gate 56 is low. An input is thus applied to the register 69 by the gate 63. After the input is stepped through the register 69, its output is applied to the input of the gate 67 to start the generation of the fourth bar. No further pulses are applied to the inputs of the gates 62 and 63, and the operation stops at this point.

Consider now the operation when the output of the gate 57 goes high. A signal is applied through the gate 64 to the input of the gate 67 and to the register 70 to start the first bar. At the same time, the output from the gate 64 is applied to the input to the gate 63. Since the output of the gate 56 is low, the other input to the gate 63 is also high, and an input is applied by the gate 63 to the register 69. When the input to the register 69 has been stepped through the register, the Q output goes high and the $\bar{Q}$ output goes low. This applies a second input to the gate 67 to start the second bar generation.

The $\bar{Q}$ output does nothing. No inputs are applied to the gate 62 or 63, so the operation stops at this point. When the gate 58 opens, its high output is applied directly to the input of the gate 67 to start the generation of a single bar.

As mentioned above, when a pulse passes through the gate 67, it is applied to the input of the register 70. The pulses from the clock 152 step the pulse content of the register 70 through its four positions. An output is taken from the register 70 at each of the four positions, and these outputs are combined in the gates 61, 72, and 73 to produce at the terminal 74 a single pulse which is four pulses wide. As shown in FIG. 2 this pulse from the terminal 74 is applied through the gate 52 to the digital-to-video converter 31 where it is converted into video signals. The video signals are applied to the radar display to produce the image that the trainee sees. The radar display comprises a cathode ray tube with sweep circuits and power supply to produce a PPI (Plan Position Indicator) scan on the face of the cathode ray tube. To produce this scan, the beam is centered in the center of the face of the cathode ray tube and is caused to sweep outwardly toward the edge of the face in a radial line. At the same time, the beam is more slowly caused to rotate circumferentially so that each radial sweep is slightly displaced from the previous radial sweep. In this manner, the entire face of the CRT is scanned. Whenever a target is to be displayed, the beam is turned on at the appropriate time and a light spot is generated on the face of the CRT. As mentioned above, each target is represented by one word stored in the memory 114. When that target also produces IFF information, the decoding of the five IFF lines from the memory 114 initiates the operation of the IFF generator as described above. For each radial sweep, each target must be represented by a separate word at the right range or time. The output of the IFF generator during each cycle of operation merely produces a spot (or two or four) on the face of the tube for a single sweep. Since the IFF displays comprises bars on the CRT face which span a number of degrees of arc (5.6° in one system which was constructed), each radial sweep must contain IFF information for the same target until the proper width bar has been generated. When more than one bar is to be generated, the apparatus in FIG. 3 operates automatically to generate the additional spots which appear on all of the sweeps. Thus, each sweep will display one, two, or four spots spaced along the radial. Since the IFF information being transmitted from the target is not reflected information but is information which was generated at the target, the strength of the signal at the radar receiver is usually much greater than that of normal target information. The IFF bars are much brighter on the display and tend to override the reflected information.

The use of the shift register in the system shown in FIG. 3 provides a system which will realistically display a large number of IFF returns, even when they appear in the same antenna sweep segment or overlap segment. The apparatus shown and described herein will display a plurality of returns along any trace even when that display ends up as a solid video because of the number of returns on that one segment. In those situations where a plurality of returns are received from angular positions of the antenna which overlap, the displayed returns may be interlaced with the displays of one return appearing between the displays of another.

This is accomplished by the continual operation of the shift registers which can be loaded with new information before the old information has completely cleared.

The above specification has described a new and improved system for simulating radar information. The apparatus described automatically generates the proper signals for the display of IFF information in digital radar simulators. It is realized that the above description may indicate to those skilled in the art additional ways in which the apparatus of this invention can be used without departing from its spirit. It is, therefore, intended that this invention be limited only by the scope of the appended claims.

What is claimed is:

1. Apparatus for simulating the operation of radar target identification equipment, said apparatus comprising a source of digital words of which each represents a radar target to be displayed, each of said words comprising a plurality of digits which together represent the type of target identification to be displayed, means for decoding the plurality of digits representing the type of target identification, said decoding means generating a separate signal for each type of identification decoded, means responsive to any of said separate signals for generating video information designated by the separate signal, means responsive to said video information for displaying the appropriate radar target identification, said means responsive to said decoding means comprising a pulse generator, means for driving said pulse generator an appropriate number of times to simulate each of said types of target identification, said pulse generator comprising at least one shift register, means for connecting the output of said decoding means to the input of said shift register, clock means connected to said shift register for shifting the contents of said shift register, and means connected to the output of said shift register for converting the digital output of said shift register in appropriate video information for display.

2. The apparatus defined in claim 1 wherein said source of digital words comprises a memory containing digital information representative of radar targets.

3. The apparatus defined in claim 1 further including means for applying the output from said shift register to the input of said shift register, said feedback means including gating means for controlling the application of said output to said input, and means for connecting said gating means to the output of said decoding means so that said feedback is effective only for some combinations of said plurality of digits representing the target application.

4. Apparatus for simulating the operation of radar target identification equipment, said apparatus comprising a source of digital words each of which represents a radar target to be displayed, each of said words comprising a plurality of digits which together represent the type of target identification to be displayed, means for decoding the plurality of digits representing the type of target identification, said decoding means generating a separate signal for each type of identification decoded, means responsive to any of said separate signals for generating video information designated by the separate signal, means responsive to said video information for displaying the appropriate radar target identification, said means responsive to said decoding means comprises a pulse generator, and means for driving said pulse generator an appropriate number of times to simulate each of said types of target identification, said generator comprising a first shift register and a second shift register, means for applying outputs from said decoding means to the inputs of said first and second shift registers, said applying means including gates whose outputs are connected to the input of each of said first and second registers, a clock connected to the clock input of said shift registers, a digital-to-video converter connected to the outputs of said first and second registers for converting the output signals therefrom into information to be displayed, and means connecting the outputs of said first and second registers to the inputs of said gates so that said signals may be circulated under appropriate conditions to generate a plurality of output signals from said registers.

5. The apparatus defined in claim 4 wherein said converter comprises a third shift register having an output from a plurality of its digit positions, means for connecting said clock to the clock input of said third shift register, means for connecting the input of said third shift register to the output from said first and second shift registers, and means for combining all of the outputs from said third shift register for application to a display means.

6. The apparatus defined in claim 1 wherein said conversion means comprises a delay device having a plurality of outputs, means for connecting the input of said delay device to the output of said shift register, and means for combining all of the outputs from said delay device into a single video signal.

* * * * *